United States Patent [19]

Williams

[11] 4,148,948
[45] Apr. 10, 1979

[54] WATER DISPERSIBLE PAINTS OF IMPROVED LEVELING CHARACTERISTICS

[75] Inventor: Carol J. Williams, East Amherst, N.Y.

[73] Assignee: Textron, Inc., Providence, R.I.

[21] Appl. No.: 796,832

[22] Filed: May 13, 1977

[51] Int. Cl.$^2$ ............................................. B05D 1/28
[52] U.S. Cl. ......................... 427/388 C; 260/29.2 E; 260/29.6 N; 427/385 R; 427/388 R; 427/428
[58] Field of Search ...................... 260/29.2 E, 29.6 N, 260/32.6 R; 427/428, 385 R, 388 R, 388 C

[56] References Cited

U.S. PATENT DOCUMENTS

| | | | |
|---|---|---|---|
| 2,427,481 | 9/1947 | Weible et al. | 260/6 |
| 3,070,256 | 12/1962 | Bremmer et al. | 260/29.2 E |
| 3,223,659 | 12/1965 | Curtice et al. | 260/29.2 E |
| 3,310,512 | 3/1967 | Curtice | 260/29.2 E |
| 3,576,728 | 4/1971 | Smith et al. | 204/181 R |
| 3,631,136 | 12/1971 | Spiller | 260/29.2 E |

*Primary Examiner*—Shrive P. Beck
*Attorney, Agent, or Firm*—Raymond F. Kramer

[57] ABSTRACT

Water dispersible paints of improved leveling characteristics, suitable for use with water in the roller coating of metal articles, such as cans, and capable of being rapidly cured to a level, unribbed and unstreaked surface despite the presence of water, include as leveling agent in the paints a water insoluble N,N-dimethyl fatty acid amide, the fatty acid of which is of 6 to 14 carbon atoms.

8 Claims, No Drawings

WATER DISPERSIBLE PAINTS OF IMPROVED LEVELING CHARACTERISTICS

This application relates to water dispersible coating compositions, such as paints, improved to be of satisfactory leveling characteristics. More particularly, it relates to such paints which are suitable for use with substantial proportions of water in the roller coating of metal articles, such as cans, and which are capable of being rapidly cured to a level unribbed and unstreaked surface despite the presence in the coating mixture of water, which usually has caused such ribbing and streaking during curing operations.

Water thinned paints have been employed in both industrial and household applications for many years and have been recognized as satisfactory coating materials in a wide variety of such uses. See U.S. Pat. No. 2,427,481, granted to Weible et al. on Sept. 16, 1947. However, lipophilic or organic solvents have usually been required in coating operations involving a fast cure at an elevated temperature because when water is present such compositions do not level satisfactorily. Thus, for example, when machine painting a metal surface with a roller or other such applicator, when the applicator is removed the paint is pulled away from the substrate, leaving a ribbed or streaked paint film, usually ribbed in the direction of movement of the roller and of a greater thickness than the rest of the paint. To avoid an objectionable ribbed or streaky appearance of the painted surface, during the period of cure such streaks or ridges must flow out into the rest of the paint to produce a smooth appearance. However, with the short times allowed in modern painting procedures for curing and drying the paint the creation of satisfactory flow and leveling conditions has proven to be a puzzling problem, which has been exceptionally difficult to solve in the case of aqueous paint systems wherein water dispersed paints based on synthetic resins and polymers are used, because of the rheological properties of such products.

Despite the problems associated with the uses of water dispersible paints, in recent years it has become more important to be able to employ them and to produce an acceptable product. In addition to the usual industrial goal of diminishing the expense of the product (by replacing more expensive organic solvent with water) air pollution control codes and regulations now often specify that significant proportions of water, must be present with organic solvent in coating compositions if such organic solvents are employed, e.g., 80% of the solvent or more as water content. Accordingly, the present inventor undertook research directed to finding compounds and producing compositions that would allow fast, high temperature cures of curable water dispersed paints, such as those used to coat metal containers, e.g., cans, without producing objectionable roller streaks, ribs or ridges. As a result of such research a small class of compounds has been found to produce unexpectedly good leveling effects in the applications mentioned when added to the water dispersible paints at comparatively low concentrations, thereby allowing production of a quality product by means of an application method which complies with air pollution control requirements for the presence of water in solvent-containing paints for commercial use in coating machines.

In accordance with the present invention a water dispersible paint of good leveling characteristics comprises a binder and an N,N-di-lower alkyl fatty acid amide in which the fatty acyl portion is of 6 to 14 carbon atoms and the lower alkyls are of 1 to 3 carbon atoms each, usually being methyl or ethyl. Preferably, the amide is an N,N-dimethyl fatty acid amide having 8 to 12 carbon atoms in the acyl group thereof, the binder is a paint binder, such as a polyester resin, an acrylic polymer or an alkyd resin or a mixture thereof, the paint contains an inorganic or organic pigment, a co-solvent and curing agent, all of such components are present in certain described proportions and the paint is utilized dispersed in water. Also within the invention are methods of painting substrates and of improving the leveling characteristics of paints which were previously unsatisfactory in this respect.

In water dispersible paints, as the water and other volatile materials which may be present evaporate, small spheres of resinous material, often 10 microns or less in diameter, which may be suspended (emulsified) in a more volatile liquid carrier, are deposited in what is intended to be a continuous film. However, despite theoretical leveling during solvent removal (and curing) if substantially greater quantities of such paint have initially been deposited at certain locations, such as at the edges of rollers, or by action of the roller pulling away from the substrate and leaving characteristic parallel ridges where cavitation occurs, insufficient leveling will often result and after fast elevated temperature curing the presence of ridges will be noticeable, unless the present amides are used.

The water dispersible coating composition employed may be any such composition which, less the mentioned N,N-di-lower alkyl fatty acid amide, produces streaking or ribbing when in the presence of water and roller applied to smooth surfaces, especially non-absorbent surfaces such as can exteriors. Thus, although the word "paint" is used herein in its normal sense, indicating the presence of an opacifying or covering component, the invention is also useful in preventing rippling or ribbing of other non-opaque coating compositions. In either case, there will be present a normal paint binder, which is a resinous or resin-forming component, and the products are called paints.

The binder or resin components of the present paints may be used alone or in mixture with each other. Of the resins that are useful the polyesters and acrylics are preferred but alkyds are often also employed. Other suitable resins or resin-forming materials that may be utilized, either in whole or in part, in place of those previously mentioned, are: phenolics; epoxies; polyesters; polyurethanes; silicones; amino resins (urea and melamine types), especially when blended with alkyds, polyesters or acrylics for baking finishes; styrene-butadiene; polyvinyl acetate; latexes; cellulosics; vinyls; and unsaturated oils. The binders, and especially the resin binders, are such a well-known class of materials that it is not considered that any further discussion or description thereof is necessary or warranted. However, further details about the mentioned materials and other such resins and binders may be found in the Encyclopedia of Chemistry, Third Edition, edited by Hampel and Hawley, published by Van Nostrand Reinhold Company (1973). In quick curing coatings, those with which the present invention is primarily concerned, the resins and binders will be curable and the resin mix, which may also include unreacted or partially reacted reagents, may have curing agent(s) present, too. The curing agents utilized for each of the curable resins will depend on the nature of the particular resin and its curing mechanism. Thus, for the polyester, acrylic and alkyd resins and other resinous materials having hydroxyl, carboxyl or amide functionality or any combination of such functionalities, cross-linking or curing may be effected by means of urea formaldehyde, melamine formaldehyde and methoxylated, ethoxylated or butoxylated forms thereof but other similarly acting agents may also be utilized to promote the curing reaction, as may be catalysts, such as benzoyl peroxide or methyl ethyl ketone peroxide with cobalt naphthenate. Such materials are well known and are described in the previously mentioned encylopedia under the headings for various resins therein, many of which were previously described. Accordingly, they need not be mentioned at length here. Of course, in addition to catalysts, promoters, activators and curing agents, all of which are intended to promote the curing reaction, one may also employ inhibitors to assist in controlling curing rates. However, in applying the preferred water dispersible paints of this invention such inhibitors are usually not employed because it is an important objective of the process to speed the reaction as much as possible, while still obtaining good coating results.

The N,N-di-lower alkyl fatty acid amide component of the present water dispersible paints has been found, surprisingly, to have the properties of improving leveling of water dispersible paints applied to substrates, especially non-sorbent substrates, and this is especially important in those instances wherein such application is part of a fast heat-curing process. Previously, in practicing such processes the flow of the paint or other coating composition was maintained by having present an organic solvent or thinner for the paint. In those instances wherein such solvent did not sufficiently promote flow to avoid ribbing of the coating such ineffectiveness was often found to be due to its being too highly volatile and therefore a higher boiling solvent would be substituted, usually with better results, because it would maintain the film fluid for a greater period of time and thereby allow more flow and better leveling. However, in using water dispersible resin solutions, especially those which are pigmented, obtaining good flow and leveling effects has proven to be particularly difficult because of the rheological properties of such in the presence of water. The water that is present with any solvent or co-solvent (which is normally lipophilic or at least less polar) has been found to make flow and leveling performance unsatisfactory and increasing water contents make it increasingly so. Consequently, at 80:20 liquid volume ratios of water to any solvent present, necessitated for compliance with air pollution codes, flow and leveling problems are particularly severe. Such problems are further greatly aggravated by rapid curing cycles, usually for no more than two minutes each, which are employed on the high speed coating lines where the water dispersible paints are used. The rapid cure for formation of the three dimensional polymer network "freezes" polymer in place and minimizes time allowable for preliminary flow and leveling.

In attempting to produce a satisfactorily leveling water dispersible paint a great number of solvent candidates was investigated and tried out in practical tests. None of these, with the exception of the amides of this invention, was found to be satisfactory, despite a wide range of boiling points, viscosities, solvent effects, polarities, densities, surface tensions and chemical compositions of the additives or mixtures thereof. Surprisingly good effects were observed with the use of the di-lower alkyl fatty acid amides in which the lower alkyls are methyl and the fatty acyl portion is of 6 to 14 carbon atoms. Best results were observed with such amides of 8 to 12 carbon atoms in the acyl portion thereof. Less satisfactory results are considered to attend the employment of those of 18 or more carbon atoms or four to fewer carbon atoms, whether of saturated or unsaturated types, and such compounds are usually unacceptable as leveling agents.

The N,N-di-lower alkyl fatty acid amides unexpectedly promote the flow of aqueous paint dispersions despite the known difficulty of accomplishing this with high proportions of water present in the paint, such as proportions from 50:50 to 90:10 of water to such amide or 50:50 to 90:10 of water to amide plus any co-solvent (or "lipophilic" solvent) that is present. The addition of water makes leveling problems more severe and of course, increasing the curing temperature and thereby shortening the curing time also causes any surface irregularities to be made more permanent in the absence of the present amides, due to the faster curing of the resins or polymers. Among the solvents or co-solvents included with the water dispersible paints in an effort to improve leveling were lower alkanols, various lower alkyl and aryl cellosolves, lower alkyl carbitols, aliphatic petroleum solvents, lower ketones, amides, amines, oxides, amine oxides, polyethers, saturated cyclic hydrocarbons, ethoxylated thioethers, aromatic ethers, glycols, aldehydes, morpholines, isophorone, nitro compounds, such as nitropropane, and esters of acetic acid, but none of these had a leveling effect like that of the mentioned N,N-di-lower alkyl fatty acid amides having 6 to 14 carbon atoms in the fatty acyl group. However, it is within the spirit of this invention to utilize such solvents and others, including the many that have been tried unsuccessfully by applicants, in conjunction with the present amides and in partial replacement thereof. Normally the proportion of such optional co-solvent should be no more than three times that of the mentioned amide and preferably, if co-solvent is present, its quantity is from 0.5 to 2.5 times that of the amide. Of course, the amide may be used alone or in mixture with other such amides, even with those outside the preferred 8 to 12 carbon atom acyl range and also outside the 6 to 14 carbon atom acyl range, e.g., N,N-dimethyl stearamide. In some cases a mono-lower alkyl substituted amide may be used instead, usually in replacement of only a part of the described amide. Among such amides are N-methyl lauramide and N-methyl caprylamide. Also, mixtures of various solvents may be utilized with the amide(s) of this invention but in many instances it will be desired to utilize one such solvent and/or one particular $C_{6-14}$ fatty acyl amide alone or in mixture with other such $C_{6-14}$ amide(s), such as with commercial amide mixtures of this type.

The operation of the present amides in the water dispersed paints is not understood. Previously, to obtain leveling in such systems one might add more higher boiling solvent so as to maintain fluidity of the paint during the curing process but in the presence of water, gel formation or other thickening of the product as solvent and water evaporates often prevents satisfactory leveling of such paints and the more water that is added the worse the problem often becomes. Thus, it was surprising and inexplicable that the present amides should produce such strikingly improved results in such compositions. It is thought that the present amides impart to the curing film the ability to change from an aqueous phase to a non-aqueous phase earlier during the continuous removal of water from the film during curing. Such might be possible because the mentioned amides can contain relatively large amounts of water and yet remain insoluble in water. It is considered that flow and leveling are more readily obtainable in the non-aqueous phase and an early shift of the system to such a phase, prior to the resin or polymer cross-linking to a rigid immobile structure, could promote desirable leveling.

The pigments employed are conventional pigments, normally water insoluble inorganic powders of particle sizes less than a micron and often as small as 100 Angstroms. Examples of such pigments include titanium dioxide, lithopone, zinc oxide, iron oxides, zinc chromates, cadmium sulfide and chrome oxide but organic pigments such as the insoluble azo pigments, acid azo pigments, phthalocyanines and various others, listed in the previously referred to encyclopedia under the headings, "Paint" and "Pigments" may also be employed. These do not interfere with the action of the present amides in normal concentrations thereof, even when the proportion of pigment present in the paint is high as 60% and even higher. Normally, such concentration will be in the range of 25 to 50%. Of course, the proportion of pigment present will not ever be so high as to physically interfere with leveling of the binder so much as to prevent leveling in accordance with this invention.

The solvents or co-solvents being used are generally lipophilic or organic in nature to dissolve the resinous binder and make it more readily flowable on the substrate to which the paint is applied. Such materials are described in detail under the headings "Solvents" and "Paints" in the encylopedia mentioned. They include hydrocarbons, alcohols, ethers, ketones, esters, chlorinated solvents and nitrated solvents, such as naphtha and mineral spirits, benzene, toluene, methyl alcohol, dimethyl ether, methyl ethyl ketone, ethyl acetate, tetrachloroethane and nitromethane, usually depending on which is the best solvent for the particular resin or polymer being utilized. Other suitable co-solvents include those previously listed herein as having been unsuccessfully tried as leveling agents. The solvents may be employed in mixture with other co-solvents and if desired, may be omitted entirely in many instances. Such solvents, e.g., n-butanol, dimethyl ethanolamine, may often be useful for thinning the binder and for producing a vehicle (binder plus solvent) that will satisfactorily spread over and coat appropriate substrates. However, if the binder itself is thin enough under the conditions of application the presence of a solvent is not required. Another conditional component of the present products, the curing agent, is usually present to expedite cross-linking and curing but alternatively one may employ reactant components of the final product that interact fast enough so that no additional curing agent is needed.

In the present paints the proportion of binder to amide will normally be in the range of 50 to 95 parts to 5 to 40 parts, preferably 60 to 85 parts of binder to 10 to 20 or 30 parts of amide. On the same basis the proportion of pigment is about 20 to 150 parts, preferably 50 to 100 parts and those of curing agent and co-solvent are each 5 to 30 parts and preferably 10 to 30 parts. Although these limits can be varied somewhat, especially in particular circumstances, and therefore may be considered as approximate, they will normally be good guides to the production of the most desirable products.

Still, it must be kept in mind that under some conditions it is possible to dispense with all of the mentioned components except the binder and amide (but pigment is normally also present) and of course water is present in the paint when applied. Furthermore, it is possible and usually preferable to employ adjuvants in the compositions, such as dyes, plasticizers, extenders, fillers, lubricants, antibacterial and antifungal constituents and perfumes. The total of such materials will normally not exceed two parts per part of binder and will preferably be less than one part per two parts of binder. Thus, proportions of individual adjuvants to binder, when adjuvants are present, will normally be in the range of 1:100 to 2:1, preferably 1:20 to 1:2. The percentages of adjuvants in the present water dispersible paint compositions will usually be in the range of 0.1 to 25%, preferably 0.5 to 5% and the percentages of the other components of the present coating compositions or paints may be calculated accordingly, as may be the compositions of the coatings, allowing for the losses of volatiles and for chemical changes.

The water dispersible paints can be stored in the anhydrous or essentially dry state and in the absence of reaction promoters such as catalysts, polymerization agents and accelerator and shortly before the intended time of application of the coating to a substrate, such as a surface of a metal or plastic can or other container to be roll-painted or similarly coated, the curing or accelerating agent can be added, before or after the addition of water, after which the coating can be applied. However, in some cases water and catalyst or other promoter are present with the water dispersible paint in storage before use. This may be feasible because normally the curing heat applied to the coated paint is necessary or important in effecting the polymerization reaction so that the product remains sufficiently stable on storage before application of such heat so as to be effectively polymerizable thereafter.

To make the present paints is a comparatively simple matter. After the production of the binder by the known chemical reactions of the various reagents which produce it, it may merely be mixed or blended with the other components, normally admixing with any organic solvent constituent first and mixing with the water last. However, some components may also be present in the reaction mix when the binder is being made. For example, it may be desirable to have the amide present in particular types of binder compositions during such reaction. It is usually preferred to have the pigment milled into the binder so as to help to maintain the suspension during application.

In use, the present paints are generally applied in mixture with water, the water content being such that the ratio of water: (N,N-di-lower alkyl fatty acid amide plus any co-solvent present) is in the range of 50:50 to 95:5 or 90:10, preferably being 60:40 to 85:15. Then the coating is applied by a roller or similar suitable means to a surface to be painted, the film applied usually being of a thickness in the range of 0.01 to 0.2 or 0.5 mm., preferably 0.01 to 0.05 mm., and the coated surface is subjected to heat, either by radiation, convection or conduction or a combination of these mechanisms or some of them, which raises the temperature of the coating to an elevated range, such as 150° to 250° C., preferably 150° to 225° C. and most preferably about 200° C. However, because temperatures as low as 120° C. may be useful curing temperatures for some resins and polymers and because some paints can withstand temperatures higher than 250° C., e.g., 350° C., the process can be suitably employed over such temperature ranges. The time of heating may vary but is usually in the range of 20 seconds to three minutes, preferably 30 to 90 seconds and most preferably about one minute. However, heating times as low as ten seconds have been useful, especially with respect to thin coatings and those as high as 30 minutes are sometimes employed. When higher curing temperatures are employed the heating times will be shorter and with lower curing temperatures the times will be lengthened. For example, an alternate curing schedule giving acceptable performance would be 10 to 20 minutes at 150° to 180° C. The articles which have been painted may be baked or cured immediately thereafter or may be stored temporarily or momentarily and subsequently baked in an oven, under radiant lamps or by other means.

Although the proportion of N,N-di-lower alkyl fatty acid amide of 6 to 14 carbon atoms in the acyl group may be varied, as previously taught, to obtain the best leveling effects, one will usually employ just enough of such material or a mixture thereof to produce the desired leveling, with a small excess. Thus, to determine the right proportion to utilize in a particular formula different percentages thereof may be admixed with the remaining components of the paint and the minimum required to result in good leveling (as determined by practical testing), plus say another 5 to 10% (based on the percentage of amide found to be needed), may be utilized to provide a safe excess. This will prevent any unnecessarily great excess of amide additive from unduly affecting other properties of the composition, too.

Although it is primarily intended that the present invention be utilized in the production of paints of good leveling characteristics which include substantial proportions of water in basically lipophilic systems the invention may also be employed to rehabilitate paints found to be below standard in leveling properties and which result in appearances of roller marks and ribs on coated work after baking. In following such method one merely admixes with such a paint, before application thereof to a substrate, a leveling improving proportion of the N,N-di-lower alkyl fatty acid amide in which the fatty acyl portion is of 6 to 14 carbon atoms, preferably N,N-dimethyl fatty acid amide wherein the fatty acid is of 8 to 12 carbon atoms, or a suitable mixture of such compounds. The proportion to employ will usually be such that 5 to 25-35 parts of the amide are added per 50 to 95 parts of paint binder present. The binder is the basis used because it is usually the binder itself which has the greatest effect on the proportions of solvent, curing agent, etc., also employed. When the final composition is within the description of the composition of this invention, as previously given, the product will normally be of satisfactory leveling characteristics and may be considered to have been successfully rehabilitated or regenerated.

The following examples illustrate but do not limit the invention. Unless otherwise indicated, all parts are by weight and all temperatures are in ° C.

EXAMPLE 1

A polyester is prepared by reaction of 28.2 parts of trimellitic anhydride, 38.1 parts of neopentyl glycol, 12.5 parts of n-butanol and 21.2 parts of adipic acid, by mixing said materials together and heating them to a temperature of 188° C. until the acid value of the reaction mix is reduced to 59. The resulting product is then cooled and mixed with 32 parts of N,N-dimethyl lauramide. The product is a water dispersible paint base which can be converted to a water dispersed paint by addition of/to water, preferably with other useful paint components, too. Such paints are very useful for machine roller coating of metal cans, which are of aluminum or tinor lacquer-coated steel.

The paint is prepared by mixing 382 parts of the polyester-amide mixture, 31 parts of dimethylethanolamine (neutralizer and co-solvent), 65 parts hexamethoxymethylol melamine curing or cross-linking agent (Cymel 301) and 300 parts of titanium dioxide pigment powder, and milling on a three-roll paint mill, followed by admixing with sufficient water (575 parts) to reduce the viscosity to approximately 90 seconds (No. 4 Ford cup). The paint made is tested, employing an automatic can roller coating machine in a simulated commercial operation. After coating (at completion of application of the coating there are noticeable "roller marks" on the cans) the cans are baked for one minute at 204° C. Upon examination of the finished painted cans, on which the paint thickness is about 0.025 mm., no objectionable roller marks, ripples, ridges, streaks or ribs are noted, apprently having disappeared during the curing operation.

In similar experiments, when the di-lower alkyl higher fatty acid amide is changed to one wherein the fatty acyl is of 8 or 10 carbon atoms or of a mixture thereof (Hallcomid M-8-10), essentially the same excellent leveling results are obtained. Similar desirable results are obtained when the fatty acyl or the amide employed is of 6 or 14 carbon atoms too, although leveling is not as good as with the amides having acyl groups of 8 to 12 carbon atoms. However, when the acyl is $C_4$ or $C_{18}$, whether saturated or unsaturated, the results, while improved over the control, are not considered to be sufficiently satisfactory to be commercially acceptable. When no amide additive or any other solvent is added to the base paint the paint coating shows objectionable roller marks and is commercially unacceptable.

When the proportions of the desirable amide additive are changed so as to be with the range of 2 to 10% of the paint acceptable leveling is obtained in most cases, with the best results being those attendant the use of greater proportions of the amide. This is also the situation when the pigment and co-solvent are omitted, with the resin-:amide ratios being within the same ranges as those for the more complete paints. However, when instead of the described amides there are substituted any of the following solvents, objectionable roller marks and ribs are still noted and the painted surfaces fail to pass ordinary commercial inspections for smooth or level appearances:

| | |
|---|---|
| n-butanol | n-propanol |
| butyl cellosolve | odorless mineral spirits |
| ethyl cellosolve | pine oil |
| methyl cellulose | octanol |
| phenyl cellosolve | M-pyrol |
| tetrahydrofurfuryl alcohol | isopropanol |
| isophorone | cyclohexane |
| butyl carbitol | cyclohexanone |
| ethyl carbitol | ethoxylated thioethers |
| | (Siponics SK, 260 and 218) |
| aliphatic petroleum solvents | diphenyl ether |
| amine oxide (Aromox C-12) | ethylene glycol |
| acetone | dipropylene glycol |
| methylethyl ketone | 1,4-dioxane |
| isobutyl ketone | heptaldehyde |
| diacetone alcohol | 1,4-butanediol |

| -continued | |
|---|---|
| 2-nitropropane | diethyl carbitol |
| butyl cellosolve acetate | amyl alcohol |
| | morpholine |
| | methyl heptyl ketone |

However, if such compounds are used as co-solvents with the amides of this invention satisfactorily leveling paints are obtainable providing that the specified percentage of the particular type of amide or a mixture thereof is present.

When the amides employed are of higher fatty acids, saturated and of 8, 10 and/or 12 carbon atoms (even-numbered with respect to acid carbon content) best leveling and product results are obtained but unsaturated and "odd-numbered" amides are also operative. Of course, when the unsaturated compounds react objectionably with other paint constituents (because of their unsaturation) they will usually be replaced with saturated counterparts.

EXAMPLE 2

An acrylic polymer is prepared by polymerization of 50 parts of butyl acrylate, 20 parts of methyl methacrylate, 20 parts of 2-hydroxyethyl acrylate and 10 parts of methacrylic acid in the presence of 17 parts of N,N-dimethyl caprylamide, 8 parts of the monoethyl ether of the diethylene glycol and one part of t-butyl hydroperoxide, as initiator, at 132° C. for ten minutes. Paints are made from the resulting resin by milling it with 300 parts of titanium dioxide and sufficient solvent to make it free flowing, e.g., 50 parts of ethyl ether of diethylene glycol, diacetone alcohol or n-butanol. Such paints, when tested by the method of Example 1, are found to be satisfactorily leveling, leaving no roller marks on coated work despite the presence of substantial proportions of water in the water dispersed coating (4:1 ratio of water:amide plus co-solvent). Similar experiments with other acrylic polymers, such as those described in the encyclopedia previously mentioned, which is incorporated herein by reference, give similar good results. However, when the amide is not present and no solvent, the same solvents or other solvents, such as those previously mentioned, are employed instead, roller marks are observed in the final product.

EXAMPLE 3

An alkyd resin is made by reaction of 35.4 parts of linoleic acid, 27.7 parts of TMP, 32.4 parts of isophthalic anhydride and 9.5 parts of trimellitic anhydride to an acid value of 48 at 232° C. To the alkyd resin produced are added 30 parts of N,N-dimethyl caprylamide and paints are prepared, using this alkyd, by addition thereto of 300 parts of titanium dioxide pigment powder and 40 parts of ethyl carbitol, diacetone alcohol or n-butanol. Such paints, when tested by the method of Example 1, result in good leveling whereas with other solvents used instead of the amide and not of the N,N-di-lower alkyl amide type of this specification, e.g., the monopropyl ether of propylene glycol, roller marks are apparent on the finished work. In the products of Example 3, as is also the case with those of Examples 1 and 2, when the amide is the only "solvent" present, i.e., n-butanol, ethyl carbitol, diacetone alcohol and other solvents are omitted, good paints of good leveling characteristics, leaving no roller marks when machine roller coated onto surfaces such as those of "tin" cans are obtained, too.

EXAMPLE 4

A polyester paint of the invention is prepared by reacting together 146 parts of trimellitic anhydride, 282 parts of neopentyl glycol, 191 parts of 2,2,4-trimethyl-1,3-pentanediol, 137 parts of phthalic anhydride and 243 parts of adipic acid at 188° C. to an acid value of 55, after which the polyester produced is diluted with 224 parts of a mixture of dimethyl fatty acid amides wherein the fatty acids are of 8 to 10 carbon atoms (Hallcomid M-8-10, mfd. by C. P. Hall Co.) and mixed with pigment, etc., milled and reduced to final paint form. One thousand parts of the polyester-Hallcomid mixture described above are blended with 60 parts of dimethyl ethanolamine, 135 parts of ethyl carbitol and 1700 parts of titanium dioxide (R-900, mfd. by E. I. duPont de Nemours & Co., Inc.) and the mix is ground on a three-roll mill to produce a paint paste. The paste is further reduced to a product of a 200 second viscosity by mixing 290 parts thereof with 80 parts of the polyester-Hallcomid M-8-10 mixture described above, 8 parts of dimethyl ethanolamine, 65 parts of hexamethoxymethylolmelamine (Cymel 301, mfd. by American Cyanamid Co.) and 300 parts of water. The viscosity measurement is taken with a No. 4 Ford cup.

The paint made is tested at the described viscosity on automatic painting equipment equipped to coat metal cans in the manner described in Example 1 and satisfactory painted surfaces are produced, without objectionable ribbing thereof, which does occur when the same product, minus the mentioned dimethyl fatty acid amide, is used in the same procedures. Similarly, when the paint is further reduced with water to a lower viscosity, such as 50, 100 and 150 seconds or by addition by additional 100, 200 and 300 parts of water, satisfactory coating without ribbing or coating irregularities is obtained, which is not the case when the Hallcomid M-8-10 is omitted.

EXAMPLE 5

A polyester is prepared by reaction of 28.2 parts of trimellitic anhydride, 38.1 parts of neopentyl glycol, 12.5 parts of n-butanol and 21.2 parts of adipic acid, by mixing said materials together and heating them to a temperature of 188° C. until the acid value of the reaction mix is reduced to 59. The resulting product is then cooled and diluted with 30 additional parts of n-butanol and is employed to make a paint designed for machine roller coating of metal cans, which are of aluminum or tin- or lacquer-coated steel.

The paint is prepared by mixing 382 parts of the polyester made (not calculating in the additional n-butanol added as solvent), 31 parts of dimethylethanolamine, 65 parts hexamethoxymethylol melamine (Cymel 301) and 300 parts of titanium dioxide pigment powder, and milling on a three-roll paint mill. Subsequently, to this paint is added 10% (78 parts) of N,N-dimethyl lauramide and after mixing for an additional five minutes the paint made is tested, employing an automatic machine can roller coater in a simulated commercial operation. After coating (at completion of application of the coating there are noticeable "roller marks" on the cans) the cans are baked for one minute at 204° C. Upon examination of the finished painted cans, on which the paint thickness is about 0.05 mm., no objectionable roller marks, ripples, ridges, streaks or ribs are noted, apparently having disappeared during the curing operation.

In similar experiments, when the di-lower alkyl higher fatty acid amide is changed to one wherein the fatty acyl is of 8 or 10 carbon atoms or of a mixture thereof, essentially the same excellent leveling results are obtained. Similar desirable results are obtained when the fatty acyl of the amide employed is of 6 to 14 carbon atoms too, although leveling is not as good as with the amides having acyl groups of 8 to 12 carbon atoms.

The invention has been described with respect to various illustrative examples and illustrations thereof but is not to be limited to these because it will be evident to one of skill in the art with the present description before him that substitutes and equivalents may be employed without departing from the invention.

What is claimed is:

1. A method of roller coating substrates with paint, characterized by good flow and leveling characteristics of the paint on the substrate, which comprises applying to such substrate from a roller, which presses against the substrate and leaves a film of paint between it and the substrate, a water dispersible paint of good leveling characteristics, dispersed in water, which comprises a resinous binder and a sufficient proportion of N,N-di-lower alkyl fatty acid amide in which the fatty acyl portion is of 6 to 14 carbon atoms to improve the flow and leveling characteristics of the point, and curing the paint at an elevated temperature.

2. A method according to claim 1 wherein the substrate is a metal can and the application of paint thereto is by means of an automatic can roller coating machine.

3. A method of painting substrates, characterized by good flow and leveling characteristics of the paint on the substrate, which comprises applying to such substrate, from an external applicator source which presses against the substrate and leaves a film of paint of a thickness in the range of 0.01 to 0.05 mm. between it and the substrate, a water dispersible paint of good leveling characteristics, dispersed in water, which comprises 50 to 95 parts by weight of a paint binder selected from the group consisting of polyester resins, acrylic polymers and alkyd resins and mixtures thereof, 5 to 40 parts by weight of N,N-dimethyl fatty acid amide in which the fatty acyl portion is of 6 to 14 carbon atoms and 20 to 150 parts by weight of an inorganic pigment, the weight ratio of water to the sum of N,N-dimethyl fatty acid amide plus any co-solvent present being in the range of 50:50 to 90:10, and then curing the paint over a period of time in the range to 20 seconds to three minutes at a curing temperature in the range of 150° to 225° C.

4. A method according to claim 1 wherein the binder is a polyester resin obtained by reaction of trimellitic anhydride, neopentyl glycol, n-butanol and adipic acid, a curing agent is present which is hexamethoxymethyl melamine, a co-solvent for the binder is present which is n-butanol or dimethyl ethanolamine or a mixture thereof, the amide is a N,N-dimethyl fatty acid amide wherein the fatty acid is of 8 to 12 carbon atoms, the paint is applied to the substrate by roller contact therewith and after application to the substrate the paint is baked to a cure for about 30 to 90 seconds at about 200° C.

5. A method of roller painting substrates, characterized by good flow and leveling characteristics of the paint on the substrate, which comprises applying to such substrate, from a roller which presses against the substrate and leaves a film of paint between it and the substrate, a water dispersible paint of good leveling characteristics, dispersed in water, which comprises 50 to 95 parts by weight of paint binder, 5 to 40 parts by weight of N,N-di-lower alkyl fatty acid amide wherein the lower alkyls are of 1 to 3 carbon atoms and the fatty acyl is of 6 to 14 carbon atoms and 20 to 150 parts by weight of pigment and then curing the paint over a period in the range of 20 seconds to 2 minutes at a temperature in the range of about 150° to 250° C.

6. A method according to claim 5 wherein the substrate is a metal can and the application of paint thereto is by means of an automatic can roller coating machine.

7. A method of improving the leveling characteristics of a water dispersible paint for automatic machine roller coating of surfaces and subsequently roller coating such a surface with such improved paint and curing it thereon, which paint is based on a curable resin or polymer dispersed in water for application to the substrate and subsequent curing at an elevated temperature for a short period of time, which comprises admixing with such paint, before application to the substrate, of a leveling improving proportion of N,N-di-lower alkyl fatty acid amide in which the fatty acyl portion is of 6 to 14 carbon atoms, roller painting the substrate with such paint containing said amide and curing the paint at elevated temperature.

8. A method of improving the leveling characteristics of a water dispersible paint for automatic machine roller coating of surfaces and roller coating a metal can with such improved paint, which paint is based on a curable resin or polymer binder selected from the group consisting of polyester resins, acrylic polymers and alkyd resins and mixtures thereof and is for application to a substrate to be painted therewith with such resin or polymer dispersed in water and for curing at an elevated temperature for a short period of time, which comprises admixing with such paint, before application to a substrate, a leveling improving portion of N,N-dimethyl fatty acid amide wherein the fatty acid is of 8 to 12 carbon atoms, and utilizing such paint in an automatic can roller coating machine to coat a metal can, after which the paint is cured at a temperature of about 200° C. for a period of about 30 to 90 seconds to produce a painted can without ribs or streaks of paint thereon from the roller.

* * * * *